United States Patent [19]

Suarez

[11] Patent Number: 4,573,850
[45] Date of Patent: Mar. 4, 1986

[54] CONTAINER AND HANDLING APPARATUS THEREFOR

[76] Inventor: Diego R. Suarez, 6847 Granada Blvd., Coral Gables, Fla. 33146

[21] Appl. No.: 679,216

[22] Filed: Dec. 7, 1984

Related U.S. Application Data

[62] Division of Ser. No. 578,013, Feb. 8, 1984, Pat. No. 4,527,939.

[51] Int. Cl.$^4$ ............................................. B65G 67/42
[52] U.S. Cl. ..................................................... 414/382
[58] Field of Search ............... 414/385, 386, 392, 393, 414/421, 575, 582, 583; 294/82 R; 298/10; 104/94

[56] References Cited

U.S. PATENT DOCUMENTS

| | | | |
|---|---|---|---|
| 1,688,657 | 10/1928 | Repper | 414/386 |
| 2,393,695 | 1/1946 | Kling . | |
| 2,760,657 | 8/1956 | Flowers . | |
| 2,936,085 | 5/1960 | Schnaitter et al. | 414/386 |
| 3,000,671 | 9/1961 | Monegato . | |
| 3,107,797 | 10/1963 | McFeaters et al. | 414/421 X |
| 3,207,346 | 9/1965 | Beutler et al. . | |
| 3,280,997 | 10/1966 | Pioch . | |
| 3,421,640 | 1/1969 | Falk | 414/421 X |
| 3,753,593 | 8/1973 | Wells et al. . | |
| 3,830,165 | 8/1974 | Turner | 104/94 |
| 3,844,615 | 10/1974 | Anderson . | |
| 4,289,353 | 9/1981 | Merritt . | |

Primary Examiner—Robert G. Sheridan
Attorney, Agent, or Firm—Fleit, Jacobson, Cohn & Price

[57] ABSTRACT

A transportable bin-type container having opposed side and end walls and opposed top and bottom walls, the container including a pair of outwardly extending pivot shafts extending from the opposed end walls to define a pivot axis. The container is adapted to be received on a truck bed, or the like, wherein a pair of spaced bearing support members are provided that extend upwardly from the truck bed in substantially parallel relationship, and that are spaced a distance slightly greater than the spacing between the end walls of the container. The bearing support members include an upper surface and an elongated, upwardly facing opening to receive one of the pivot shafts of the container, the opening including a pair of spaced, substantially parallel walls the outermost of which is longer than the innermost to define a transverse stop means for the pivot shafts when the container is being loaded on the truck bed. The container is dumped while on the truck bed by apparatus separate from the truck and that includes a guide rail that passes over and around the top of the truck bed. The dumping apparatus includes a hook means to engage a hooking bar on the container, the hook means extending from a carriage that is transported along the guide rail to progressively tilt the container about the pivot axis defined by the pivot shafts, and thereby cause the contents of the container to be dumped through an opening in the upper wall and adjacent the side of the truck bed opposite to the side on which the dumping apparatus is positioned.

6 Claims, 7 Drawing Figures

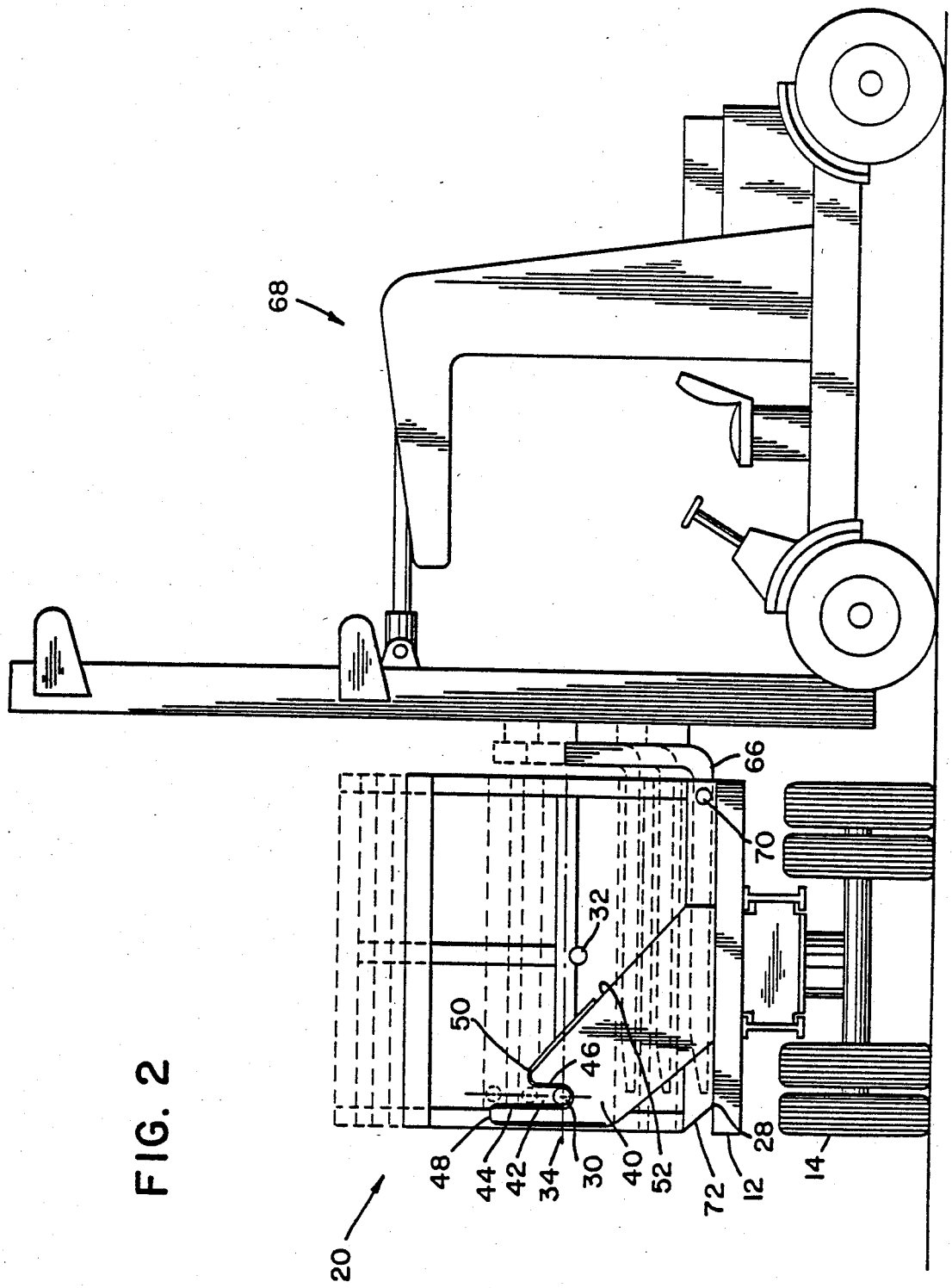

CONTAINER AND HANDLING APPARATUS THEREFOR

This is a divisional of application Ser. No. 578,013 filed Feb. 8, 1984, now U.S. Pat. No. 4,527,939.

BACKGROUND OF THE INVENTION

1. Field of the Invention

This invention relates to containers for loose materials, and more particularly to an improved container having a pair of outwardly extending pivot shafts received in bearing support members carried by a transporting vehicle, and container dumping apparatus adapted to tilt the container about the pivot shafts to cause the contents thereof to be emptied at a desired location.

2. Description of the Prior Art

Various types of tiltable dump bins or containers carried by a vehicle have been suggested, both for end dumping and for side dumping, relative to the vehicle. For example, in U.S. Pat. No. 4,289,353, a combination belly dump/end dump vehicle is disclosed wherein loose materials within a tiltable hopper can be dumped therefrom, the hopper being permanently carried by the vehicle. As shown in that patent, only single hopper is provided.

In U.S. Pat. No. 3,844,615, there is shown and described another variation of a dump bin or container permanently carried on a transport vehicle such as a trailer or a truck. As disclosed in that patent the dumping action takes place over the tail end of the vehicle.

Another tiltable bin or container, one adapted for side dumping is disclosed in U.S. Pat. No. 3,753,593 with the bin or container pivotable about an axis that is supported on a frame carried by the transport vehicle body.

The prior ar devices disclosed in the above-identified patents involve bins or containers that are secured to a vehicle, and the vehicle carries hydraulically operated means to cause the bin or container to tilt in the desired direction to permit the discharge of materials contained therein. However, because the bins are secured to the vehicles, the flexibility of use of such devices is rather limited. Additionally, those disclosed arrangements are relatively costly in that the hydraulically operated dumping mechanisms must be provided on each vehicle.

Accordingly, it is an object of the present invention to provide a transportation container for loose materials, the container being removable from a transporting vehicle, and wherein the transporting vehicle includes supporting means to pivotally support the container to permit tilting thereof and discharge of the contents therefrom.

It is another object of the present invention to provide a transportation vehicle to carry tiltable bins or containers, the vehicle serving merely as a carrier thereof and not including a tilting mechanism.

It is a further object of the present invention to provide a stationary container tilting apparatus at a predetermined dumping station, the apparatus engageable with a tiltable bin or container pivotally carried by a suitable transport vehicle.

It is a still further object of the present invention to provide a transportation container and a transport vehicle wherein latching or locking mechanisms are not required to keep the containers securely in place while they are being hauled.

It is another object of the present invention to provide a container tilting mechanism that protects the dumping system from the sudden jerk produced when a tiltable container is tilted to the point that the center of gravity of the container passes over and past its pivot point.

SUMMARY OF THE INVENTION

In accordance with one aspect of the present invention, a transportable bin-type container is provided for transporting portable materials. The container includes an enclosure that is defined by opposed side and end walls and includes opposed top and bottom walls. The top wall includes a pivotable portion to provide an opening through which the materials to be transported can be loaded into and dumped from the container. Each of the end walls includes an outwardly extending pivot shaft, the pivot shaft being coaxial and positioned laterally outwardly of the centroid of the container and lying in a horizontal plane adjacent to the horizontal plane passing through the centroid. The end walls each include chamfered guide means surrounding the pivot shafts to guide and position the container relative to bearing means adapted to rotatably receive the pivot shafts. At least one of the end walls includes an outwardly extending hooking bar spaced on the opposite side of the centroid of the container from the pivot axis, the hooking bar being adapted for cooperable engagement with a hook means to engage the hooking bar in order to tilt the container about the pivot shaft axis.

In accordance with another aspect of the present invention, a vehicle is provided for transporting at least one material-carrying container having pivot shafts extending from each of two opposed end walls, the vehicle including bearing supports for rotatably supporting the pivot shafts. Each of the bearing supports includes an upper surface and an elongated, upwardly extending opening to receive one of the pivot shafts, the recess defined by a pair of spaced walls the outermost of which, relative to the transporting means, is longer than the innermost wall to define a transverse stop means to facilitate the positioning of the pivot shaft within the bearing support member.

BRIEF DESCRIPTION OF THE DRAWINGS

FIG. 2 is a rear elevational view of the truck and container shown in FIG. 1 with a fork lift truck depositing the container on the trailer bed.

DESCRIPTION OF THE PREFERRED EMBODIMENT

Figure 1:
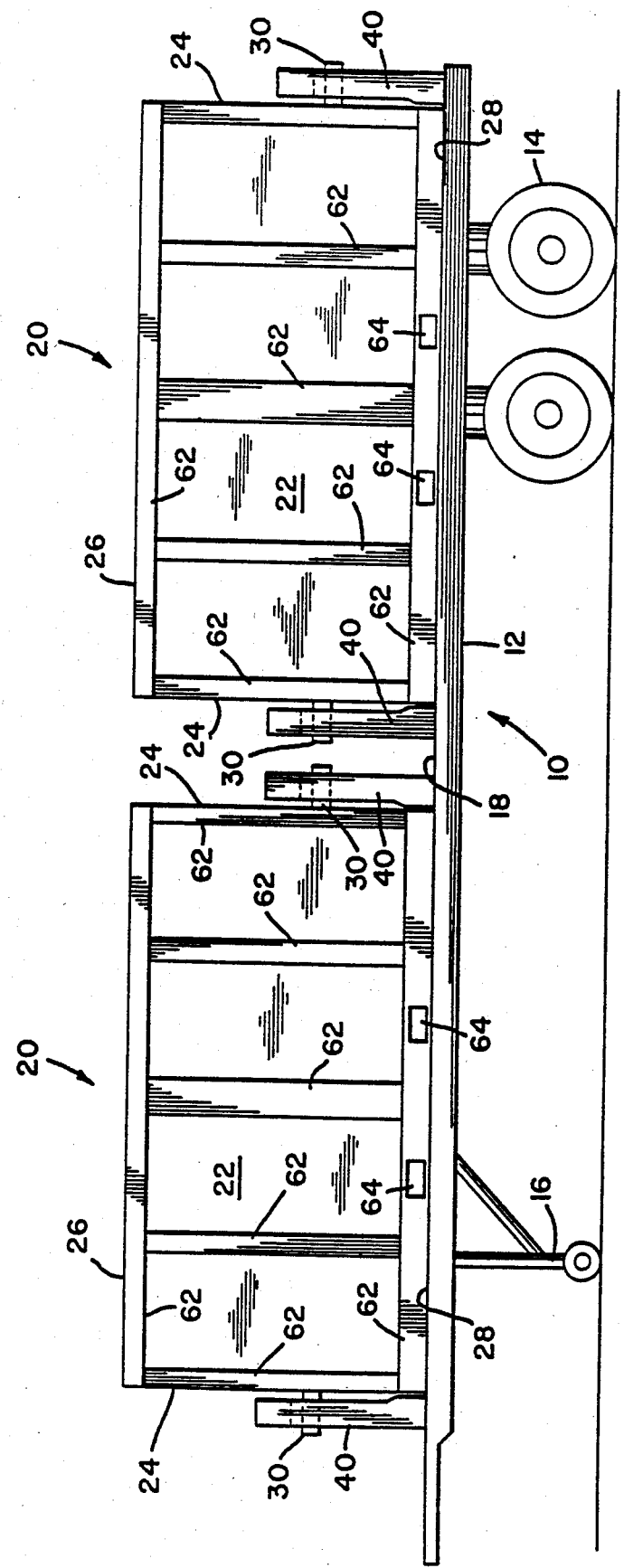
FIG. 1 is a side view showing a truck trailer carrying two containers in accordance with the present invention.

Referring now to the drawings, and particularly to FIGS. 1 and 2 thereof, there is shown a vehicle in the form of a truck trailer 10 including a trailer bed 12 that is suitably supported by and carried on a set of rear wheels 14 and also including a front wheel assembly 16, that is preferably foldable against the bed. The bed 12 is of generally rectangular configuration and has a flat upper surface 18 for carrying articles such as containers 20. The trailer 10 is adapted to be attached to and pulled by a conventional tractor unit (not shown).

The containers 20 include a pair of opposed side walls 22, a pair of opposed end walls 24, and opposed top 26 and bottom 28 walls. The top wall 26 is provided with an opening, which can be a pivotable door (not shown), throu9h which the materials to be transported can be loaded into and dumped from the container. Although disclosed in terms of having a top wall, the container 20 can have an open top, if desired. Each of the end walls 24 of the container includes an outwardly extending pivot shaft 30, the pivot shafts of each of the end walls being coaxial and positioned closely adjacent to one of the side walls 22 and spaced laterally outwardly of the centroid 32 of the volume defined by the container 20. The pivot shaft axis also lies in a horizontal plane 34 that is adjacent to and spaced slightly upwardly from the horizontal plane that passes through centroid 32 of the container.

Figure 3:
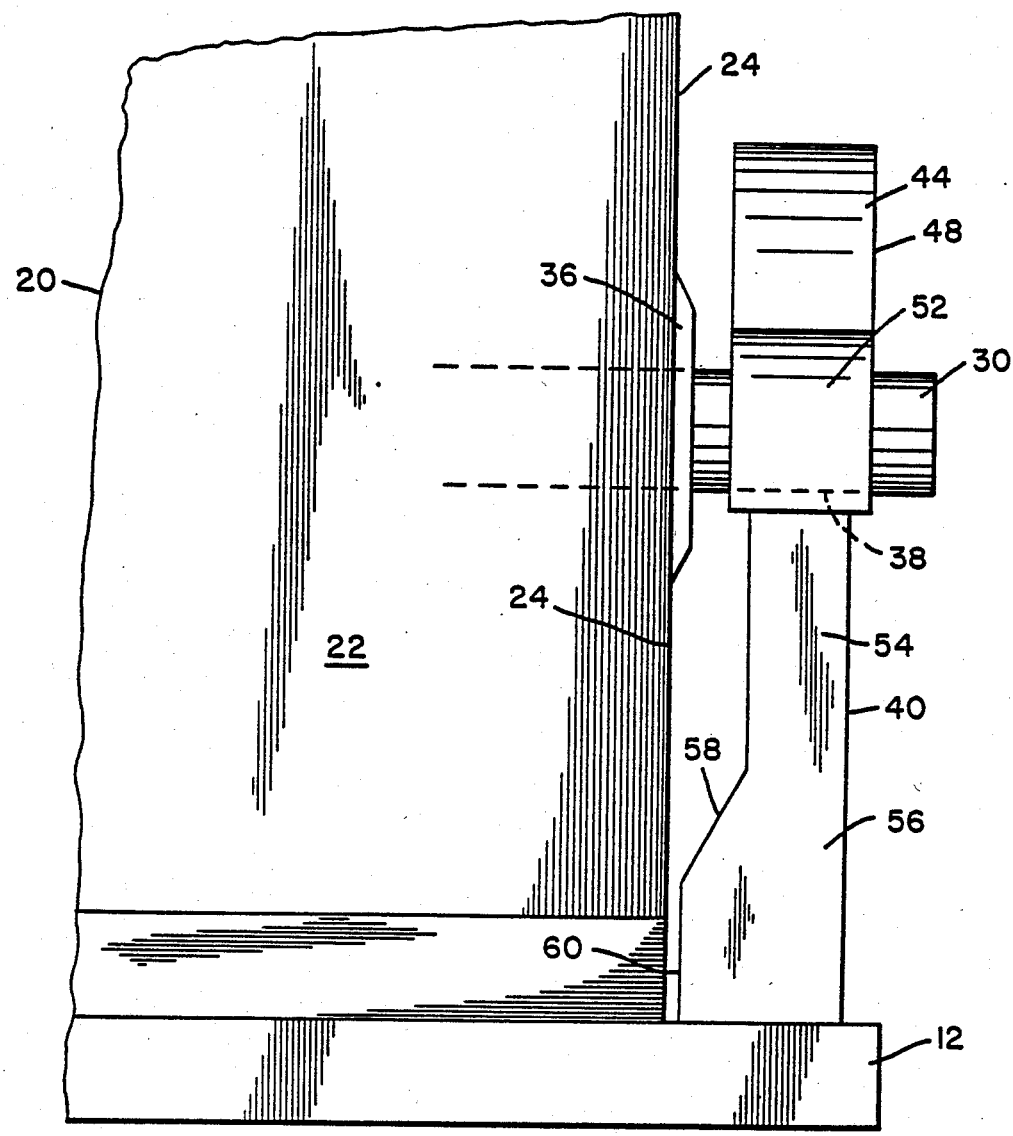
FIG. 3 is an enlarged fragmentary end view showing one end of the bin showing a pivot shaft in cooperative engagement with a bearing support member carried by the trailer body.

As best seen in FIG. 3, the container end walls include a chamfered guide 36 that surrounds the respective pivot shaft 30 in order to guide and position the container relative to bearing surfaces 38 that are carried on the trailer bed. The chamfered guide means are of generally annular configuration and are secured to each of the respective container end walls in substantially concentric relationship with the pivot shafts.

Referring now to FIGS. 1, 2, and 3, the trailer bed 12 includes a plurality of upstanding, spaced and generally parallel bearing support members 40, the spacing therebetween determined by the distance between the end walls of a container, together with an additional small clearance space. Thus, the bearing support members 40 are spaced a distance slightly greater than the spacing of the end walls 24 of the container, in order to permit the container to be conveniently positioned therebetween.

As seen most clearly in FIGS. 2 and 3, the bearing support members 40 are of generally plate-like conformation, and include an upwardly directed, elongated opening defined by a pair of spaced vertical walls, the outermost wall 44, relative to the bed, being longer than the innermost wall 46 to define an upstanding transverse stop 48. The shorter, innermost wall 46 has a rounded upper edge 50 that blends into an inclined slide surface 52 against which the pivot shafts 30 can be pushed in the course of loading the container 20 onto the trailer bed 12.

Referring once again to FIG. 3, the bearing support member 40 is shown in elevation with a pivot shaft 30 positioned on the bearing surface 38 thereof. The bearing surface 38 is the rounded, lowermost portion of opening 42. The outermost longer wall 44 and transverse stop 48 are shown in relation to the inclined surface 52. Also as shown, the center portion 54 of bearing support member 40 is of a thinner construction than the upper portion containing the slide 52 and stop 48, and is also thinner than the lower portion 56, which includes an inwardly and downwardly directed chamfered surface 58, relative to the trailer bed 12, for the purpose of guiding the container 20 into position after the pivot shaft 30 has entered the opening 42. The spacing between the respective innermost surfaces 60 of the bearing support members 40 is slightly larger than the spacing between the outer surfaces of the end walls 24 of the container in order to permit the container to be conveniently positioned therebetween and to hold end play, or movement along the pivot shaft axis, to a minimum.

As seen in FIGS. 1 and 2, the containers 20 can include a plurality of box-beam-type stiffening members 62 affixed to each of the walls thereof to add rigidity to the respective walls. At the lower portions of each of the side walls 22 the container includes a pair of spaced openings 64 to receive the forks 66 of a fork lift truck 68 in order to facilitate handling and carrying of the container and loading onto and unloading from the trailer bed 12. As seen in FIG. 2, the container also includes at least one outwardly extending hooking bar 70 positioned on one of the end walls 24 and extending in a direction generally parallel to that of the pivot shafts, the hooking bar adapted for cooperable engagement with a hook means for tilting the container about the pivot shaft axis in a manner to be hereinafter described in greater detail. Thus, the container 20 can be carried to and deposited on the trailer bed 12 or removed therefrom, by means of a fork lift truck 68 as illustrated in FIG. 2, the forks 66 of the truck passing through the respective fork openings 64 provided in the side walls of the container.

When the container 20 has been loaded to the extent desired with the materials to be carried, the lift truck forks 64 are inserted into the fork openings 64, and the container is lifted in the conventional manner. Thereafter the container is carried to the trailer bed 12 and is elevated to a height as shown in the uppermost set of dashed lines in FIG. 2. The container is then oriented relative to the bearing support members 40 so that the two side walls 22 fit between a pair of the bearing support members 40 and the container is carried transversely, relative to the trailer bed 12, until the pivot shafts 30 engage the respective longer, outermost walls 44 of the elongated opening 42. Thereupon the forks of the lift truck are lowered until the bottom wall 28 of the container rests on the top surface of the trailer bed 12, and the pivot shafts 30 are received against the respective bearing surfaces 38 of the bearing support members 40. As shown in FIG. 2, the base of the container has a chamfered edge 72 at the corner adjacent to the side wall closest to the axis of pivot shaft 30, in order to prevent interference between the adjacent edge of the container and the trailer bed while the container is rotated into a dumping position.

Figure 4:
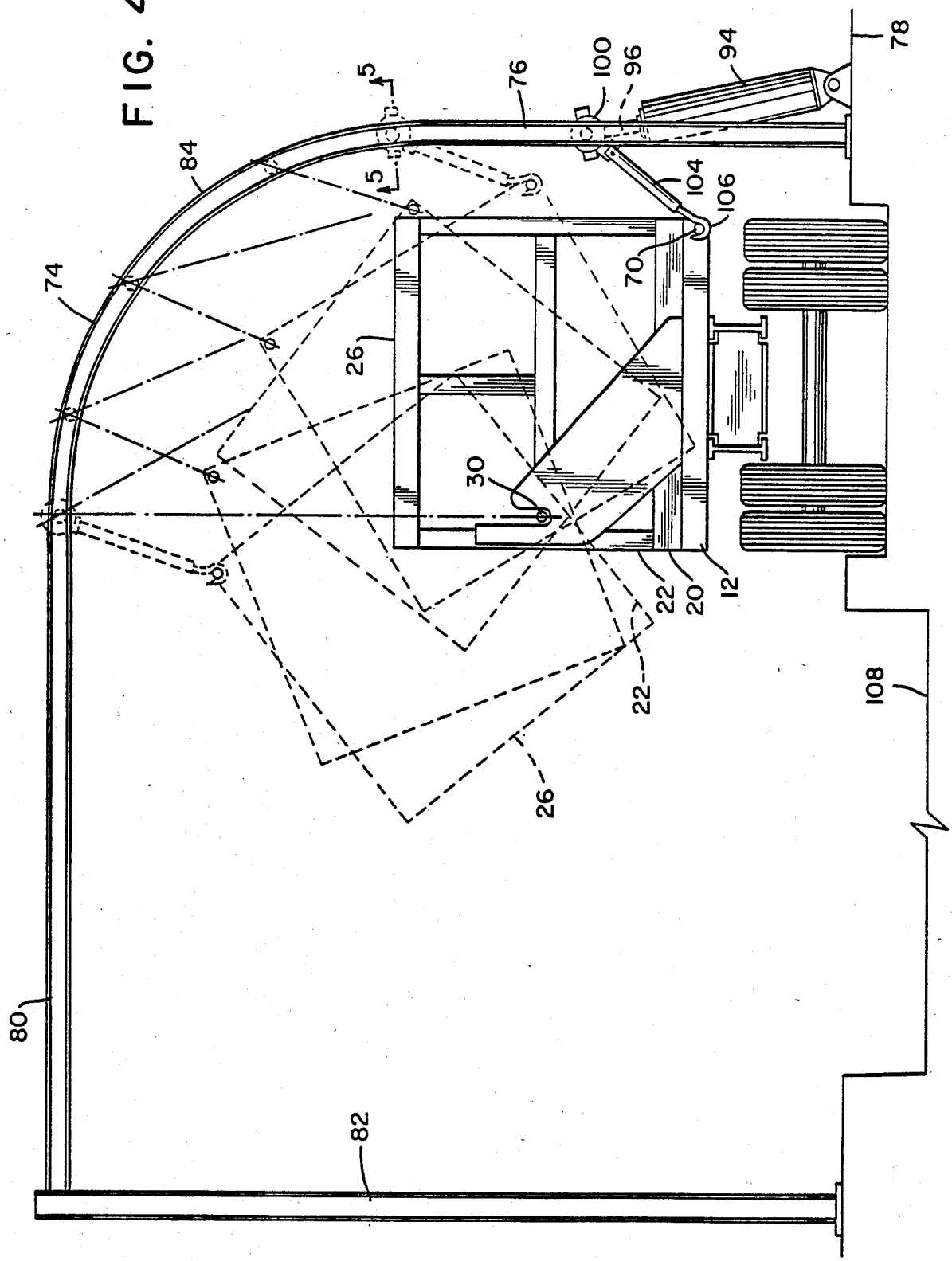
FIG. 4 is an end elevational view of a vehicle carrying a container in accordance with the present invention, the assembly positioned beneath a container tilting apparatus.

Referring now to FIG. 4, there is shown one form of tilting apparatus whereby the containers of the present invention can be tilted relative to the trailer body in order to discharge the contents thereof. As shown, the tilting apparatus includes a guide rail 74 that includes an upwardly directed vertical section 76 that is secured to a rigid surface 78, a horizontal section 80 supported by a vertical stanchion 82, and an intermediate, arcuate section 84 defined by a circular arc.

Figure 5:
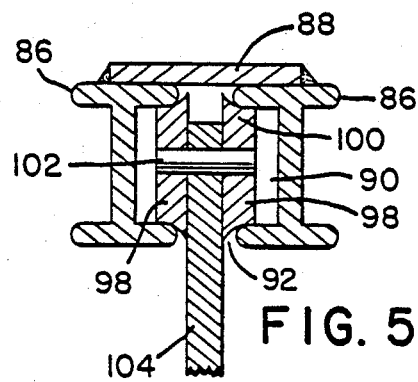
FIG. 5 is an enlarged fragmentary cross-sectional view taken along the line 5—5 of FIG. 4.

As best seen in FIG. 5, the guide rail is provided in the form of a pair of side-by-side I-beams 86 that are laterally spaced from each other and are connected across their outermost surfaces, relative to the trailer bed, by means of a plurality of spaced connector plates 88 that are welded to the outermost surfaces of the I-beams 86. As so configured, the spaced I-beams define a generally rectangular channel 90 having a continuous, axially disposed opening 92 that faces inwardly toward the trailer bed 12. An hydraulic cylinder 94 is pivotally secured to the rigid surface 78 adjacent to the vertical portion 76 of the guide rail and includes a telescoping piston rod 96, the latter pivotally carrying a pair of spaced wheels 98 at its distal end in the form of a carriage 100 adapted to ride within the channel 90 between the respective I-beams, as shown in FIG. 5. The wheels 98 are carried in bearings (not shown) that ride on a shaft 102, and between the respective wheels there is positioned a hook arm 104 that is pivotally supported by the shaft 102. As seen most clearly in FIG. 4, the hook arm 104 includes an elongated portion that terminates in a hook 106 at the end opposite from the carriage 100 in order to engage hooking bar 70.

In operation, the trailer 10 is pulled into position so that the container 20 is in the desired position for unloading of the contents thereof, which can be into another, adjacent vehicle (not shown) positioned in the recessed area 108 shown in FIG. 4. When the trailer has been positioned so that the hooking bar 70 is approximately laterally opposite the hook arm 104, the hook 106 is brought into engagement with the hooking bar 70 and hydraulic fluid is admitted into the cylinder 94 to cause the piston rod 96 to extend axially and move upwardly to thereby carry the carriage 100, the hook arm 104, and the hook 106 upwardly along the guide rail 74 to cause the container 20 to tilt through the several positions illustrated by the dashed lines in FIG. 4 by pivoting around the axis defined by the pivot shafts 30. Thus, as shown, the container 20 as shown in full lines is pivoted from a first position in which it is resting on the trailer bed 12, to a final, dumping position in which the container has been tilted about the tilt axis defined by the pivot shafts to a point where the side wall 22 is inclined outwardly and downwardly and an opening in the top wall 26 is exposed to permit the contents of the container to be dumped therefrom. Thus, it can be seen that the hook 106 and hook arm 104 retain the hooking bar 70 throughout the entire range of movement of the container 20 about the pivot axis. When the dumping operation has been completed the piston rod 96 is retracted into the cylinder 94 to pull the carriage 100 and connected hook arm and hook along the circular arc 84 of the guide rail 74 from the dumping position to the rest position, in which the container is upright an the trailer bed 12. Thereafter, the hook 106 is disengaged from the hooking arm 70 and the trailer and containers ca be transported for refilling once again.

Figure 6:
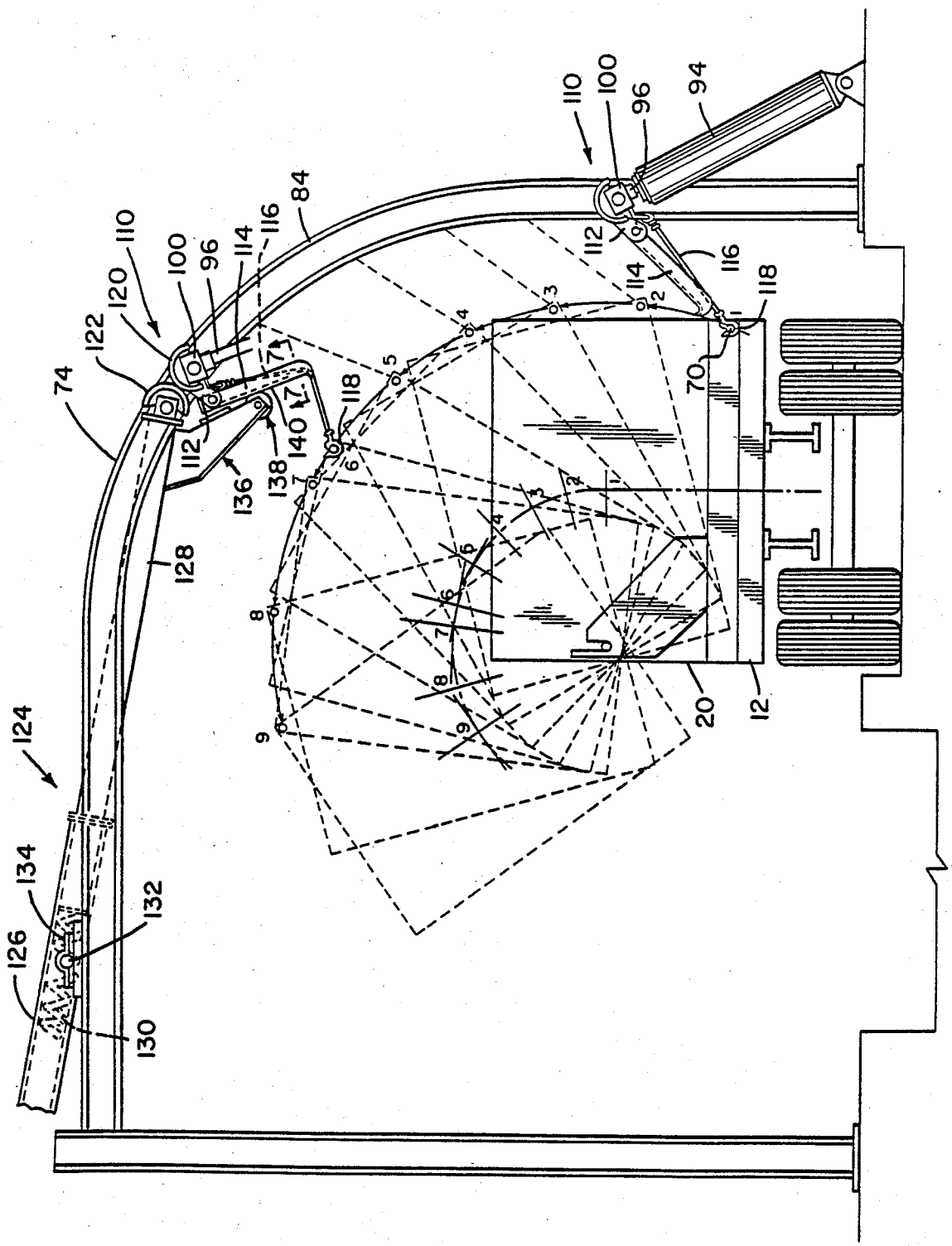
FIG. 6 is a view similar to FIG. 4 but showing another embodiment of a container tilting apparatus.

Another embodiment of a container tilting apparatus that can be used in connection with the container of the present invention is illustrated in FIG. 6. The apparatus there shown is similar in structure and operation to that illustrated in FIG. 4, except that the distal end 110 of the piston rod 96 includes a bracket 112 that pivotally carries an arm 114 and a cable 116 to which a locking-type hook 118 is secured. The locking-type hook 118 is adapted to engage the hooking bar 70 and has a lateral opening that is smaller than the diameter of the hooking bar, and therefore it must be attached thereto in an axial direction to engage the hooking bar without permitting release thereof in a transverse direction, relative to the hooking bar axis, until the hook is aqain axially withdrawn from the hooking bar.

Figure 7:
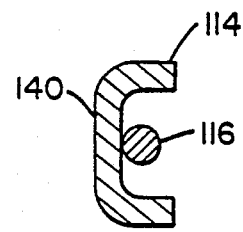
FIG. 7 is an enlarged cross-sectional view taken along the line 7—7 of FIG. 6.

The distal end 110 of piston rod 96 includes a bumper head 120 adapted to contact a corresponding bumper head 122 positioned on a shock absorber 124 in the form of a pair of telescoping tubes 126, 128 that include an internally positioned compression spring 130. The shock absorber 124 includes a transverse pivot shaft 132. that is rotatably supported in a bearing block 134 mounted on the upper surface of the guide rail 74. The shock absorber 124 also includes a pair of spaced, downwardly extending side plates 136 that carry a roller 138 adapted to engage the outer longitudinal surface 140 of the arm 114 as the latter approaches the shock absorber 124 toward the uppermost end of the circular arc 84 of the guide rail 74. The arm 114 is of generally channel-like shape as shown in FIG. 7, and the cable 116 is positioned within the open portion of the channel 114.

In the operation of the FIG. 6 embodiment, the locking hook 118 is connected to the piston rod 96 by means of cable 116, and as the piston rod 96 extends from the cylinder 94 the cable 116 pivots about the distal end 110 of the piston rod 96 in a generally counterclockwise direction as viewed in FIG. 6, until the carriage 100 reaches almost the uppermost vertical portion of its path of travel, whereupon the bumper head 120 on the piston rod end 110 engages the bumper head 122 on the shock absorber 124, and the roller 138 carried by the plates 136 of the shock absorber 124 causes the arm 114 to pivot in a counterclockwise direction and to engage the cable 116 so that the latter is extended in a generally lateral direction, as shown in FIG. 6, to assume an L-shape. As the piston rod 96 is further extended, the spring 130 in the shock absorber 124 is slowly compressed, and when the hooking bar 70 reaches the point in its circular path of travel about the pivot axis at which the center of gravity of the container and its contents passes through the highest point in its path of travel, the resistance imposed by the compressed spring 130 in the shock absorber 124 provides a resisting force to prevent a rapid forward jerking movement of the container 20, thereby minimizing impact loads on the various elements of the system during the dumping operation. Consequently, the dumping motion is a smooth, continuous motion, rather than a smooth motion until just before the dumping position is reached, where the container suddenly lurches forward at a greater rate. Thus, the shock absorber helps to take up the shock load that would otherwise occur after the container goes over the center position defined by a vertical axis passing through the highest point in the path of travel of its center of gravity.

Although particular embodiments of the present invention have been illustrated and described, it will be apparent to those skilled in the art that various changes and modifications can be made without departing from the spirit and scope of the present invention, and it is intended to cover in the appended claims all such changes and modifications that fall within the scope of the present invention.

What is claimed is:
1. Container dumping apparatus comprising:
 a. a guide rail extending upwardly adjacent to and over a vehicle carrying a tiltable container;
 b. hook means for engaging a hooking bar extending from a container;
 c. carriage means connected with said hook means, said carriage means supported for movement along said guide rail;

d. means for moving said carriage means along said guide rail with said hook means engaging a hook receiving means carried by a tiltable container from an initial position in which the container is upright and at rest, to a final position in which the container has been tilted about a tilt axis to dump the contents thereof; and e. shock absorber means carried by said guide rail to engage said carriage means for providing resistance to movement of said carriage means in a tilting direction of said container to prevent a rapid forward jerking movement of the container after the center of gravity of the container passes through the highest point in its path of travel.

2. The apparatus of claim 1 wherein said guide rail is defined by a pair of spaced, side-by-side members defining a generally rectangular channel having a continuous longitudinal opening facing said vehicle.

3. The apparatus of claim 1 wherein said means for moving said carriage means includes an hydraulic cylinder having an end pivotally secured to a rigid surface and a piston rod connected to said carriage means for moving said carriage means along said guide rail.

4. The apparatus of claim 1 wherein said hook means includes a cable extending from said carriage means for supporting said hook means from said carriage.

5. The apparatus of claim 1 wherein said shock absorber means comprises a tubular shock absorber pivotally supported on an upper surface of said guide rail and defined by a pair of telescoping tubes, and a compression spring positioned within said tubes to provide resistance to inward telescoping movement therebetween, said shock absorber including bumper means to engage said carriage means when the container center of gravity approaches the highest vertical point in its path of travel during tilting movement of said container.

6. The apparatus of claim 5 wherein said shock absorber means includes roller means for contacting said hook means for pivoting said hook means about a pivot axis carried by said carriage and in a direction away from said shock absorber means.

* * * * *